US012620383B2

(12) United States Patent
VanBecelaere et al.

(10) Patent No.: US 12,620,383 B2
(45) Date of Patent: May 5, 2026

(54) ACOUSTIC INSULATION MATERIAL

(71) Applicant: Carver Non-Woven Technologies, LLC, Fremont, IN (US)

(72) Inventors: Karl L VanBecelaere, Fort Wayne, IN (US); Robert D. Earnest, Lake Orion, MI (US)

(73) Assignee: Carver Non-Woven Technologies, LLC, Fremont, IN (US)

( * ) Notice: Subject to any disclaimer, the term of this patent is extended or adjusted under 35 U.S.C. 154(b) by 559 days.

(21) Appl. No.: 17/698,688

(22) Filed: Mar. 18, 2022

(65) Prior Publication Data

US 2023/0298552 A1    Sep. 21, 2023

(51) Int. Cl.
*G10K 11/168*        (2006.01)
*B32B 5/02*          (2006.01)
(Continued)

(52) U.S. Cl.
CPC ............ *G10K 11/168* (2013.01); *B32B 5/022* (2013.01); *B32B 5/266* (2021.05); *B32B 7/022* (2019.01); *B32B 7/10* (2013.01); *D04H 1/4266* (2013.01); *D04H 1/4274* (2013.01); *D04H 1/435* (2013.01); *B32B 2250/02* (2013.01);
(Continued)

(58) Field of Classification Search
CPC ....... G10K 11/168; B32B 5/022; B32B 5/266; B32B 7/022; B32B 7/10; B32B 2250/02; B32B 2250/20; B32B 2262/0284; B32B 2262/062; B32B 2262/144; B32B 2307/102; B32B 2307/72; B32B 2262/0253; B32B 5/08; B32B 2262/04; B32B 2262/08; B32B 2605/00; B32B 7/04; D04H 1/4266; D04H 1/4274; D04H 1/435; D04H 1/43835; D04H 1/485; D04H 1/5412; D04H 1/559; D04H 1/732; D10B 2211/02; D10B 2331/04
See application file for complete search history.

(56) References Cited

U.S. PATENT DOCUMENTS 3,819,465 A * 6/1974 Parsons .................... B32B 5/26
                                                        442/13
5,079,074 A * 1/1992 Steagall ................... B32B 5/14
                                                       428/218

(Continued)

FOREIGN PATENT DOCUMENTS

WO    WO-2014089470 A1 * 6/2014 ............. B32B 5/022

OTHER PUBLICATIONS

"Needle Punched Nonwovens", Saxon Machinery, Jan. 2001, https://www.saxonmachinery.com/new/filter-bags/needle-punched-nonwovens.html. (Year: 2001).*

*Primary Examiner* — Christopher W Raimund
(74) *Attorney, Agent, or Firm* — TAYLOR & EDELSTEIN, PC

(57)            ABSTRACT

An acoustic insulation web of fibrous material includes: a nonwoven batting including: a first layer including a first plurality of low-melt binder fibers forming a first predetermined percentage of the first layer; and a second layer bonded with the first layer and including a second plurality of low-melt binder fibers forming a second predetermined percentage of the second layer, the first predetermined percentage being greater than the second predetermined percentage such that the first layer is denser than the second layer.

12 Claims, 3 Drawing Sheets

(51) Int. Cl.

| | |
|---|---|
| *B32B 5/26* | (2006.01) |
| *B32B 7/022* | (2019.01) |
| *B32B 7/10* | (2006.01) |
| *D04H 1/4266* | (2012.01) |
| *D04H 1/4274* | (2012.01) |
| *D04H 1/435* | (2012.01) |

(52) U.S. Cl.
CPC ... *B32B 2250/20* (2013.01); *B32B 2262/0284* (2013.01); *B32B 2262/062* (2013.01); *B32B 2262/144* (2021.05); *B32B 2307/102* (2013.01); *B32B 2307/72* (2013.01); *D10B 2211/02* (2013.01); *D10B 2331/04* (2013.01)

(56) References Cited

U.S. PATENT DOCUMENTS

| | | | |
|---|---|---|---|
| 7,147,734 B2 | 12/2006 | Ogle et al. | |
| 7,238,633 B1 * | 7/2007 | Kaylor ................. | A47C 27/121 442/381 |
| 2011/0057346 A1 * | 3/2011 | Nunn ................... | D04H 1/4274 28/103 |
| 2013/0000813 A1 * | 1/2013 | Muzyrya ................. | D04H 1/74 156/499 |
| 2021/0358466 A1 | 11/2021 | VanBecelaere | |

\* cited by examiner

350

352

Providing first and
second layers

354

Thermally bonding the first
and second layers together

ACOUSTIC INSULATION MATERIAL

BACKGROUND OF THE INVENTION

1. Field of the Invention

The present invention relates to nonwoven materials, and, more particularly, to nonwoven acoustic insulation materials.

2. Description of the Related Art

Acoustic insulation materials are materials that dampen, abate, or otherwise absorb sound waves. Such materials thereby form a shield or barrier between a noise-making device and an environment in which noise stemming therefrom is undesirable. Such acoustic insulation materials find a variety of applications. For instance, with respective to automotive applications, the engine of an automobile can produce a substantial amount of noise, which can range from annoying or uncomfortable to utterly intolerable for persons in the passenger compartment of the vehicle. Acoustic insulation materials can be used to shield the passenger compartment from such engine noises by placing these materials in certain places about the passenger compartment. Such places include in or about a front dashboard, and/or the floor of the passenger compartment. With respect to the floor, for instance, the acoustic insulation material can be positioned underneath carpeting on the floor, thus serving as a carpet underlayment.

What is needed in the art is an improved, cost-efficient acoustic insulation material and method of forming such material.

SUMMARY OF THE INVENTION

The present invention provides an acoustic insulation web of fibrous material forming a nonwoven batting with two layers of different density, the denser layer having a higher-percentage of low-melt binder fibers than the less dense layer.

The invention in one form is directed to a manufacturing system for making an acoustic insulation web of fibrous material, the manufacturing system including: a first web former configured for forming a first layer including a first plurality of low-melt binder fibers forming a first predetermined percentage of the first layer; a second web former configured for forming a second layer bonded with the first layer, the second layer a second plurality of low-melt binder fibers forming a second predetermined percentage of the second layer; and a heating mechanism configured for thermally bonding the first layer and the second layer together, the acoustic insulation web being a nonwoven batting, the first predetermined percentage being greater than the second predetermined percentage such that the first layer is denser than the second layer.

The invention in another form is directed to an acoustic insulation web of fibrous material, including: a nonwoven batting including: a first layer including a first plurality of low-melt binder fibers forming a first predetermined percentage of the first layer; and a second layer bonded with the first layer and including a second plurality of low-melt binder fibers forming a second predetermined percentage of the second layer, the first predetermined percentage being greater than the second predetermined percentage such that the first layer is denser than the second layer.

The invention in yet another form is directed to a process for making an acoustic insulation web of fibrous material, the method including the steps of: providing a first layer and a second layer, the first layer including a first plurality of low-melt binder fibers forming a first predetermined percentage of the first layer, the second layer including a second plurality of low-melt binder fibers forming a second predetermined percentage of the second layer; and bonding thermally the first layer and the second layer together, the acoustic insulation web being a nonwoven batting, the first predetermined percentage being greater than the second predetermined percentage such that the first layer is denser than the second layer.

An advantage of the present invention is that the layers of the acoustic insulation web can be formed and joined in a heating device, such as an oven.

Another advantage is the different densities of the two layers occurs by way of different fiber blends of the two layers, in particular, the different amounts of low-melt binder fibers in the layers, as opposed to requiring a plurality of needling steps.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
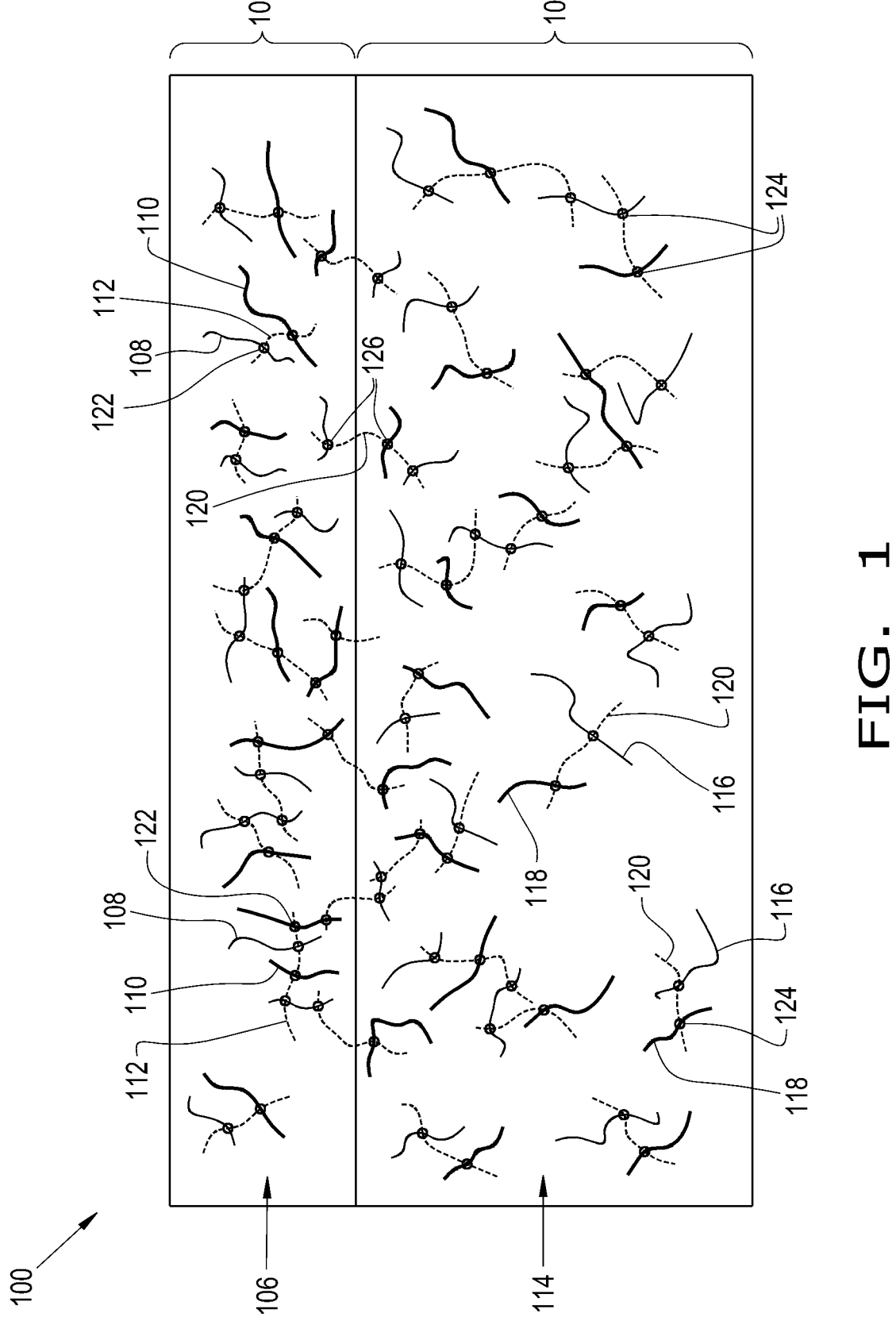
FIG. 1 is a side view of an exemplary embodiment of an acoustic insulation web of fibrous material, the web including a first layer and a second layer, in accordance with an exemplary embodiment of the present invention.

Referring now to the drawings, and more particularly to FIG. 1, there is shown (schematically) an acoustic insulation web 100 of fibrous material. Web 100 can also be referred to as a sheet, felt, or felt sheet. Further, web 100, as a final product, forms a nonwoven batting 100 (and thus can be referred to herein as batting 100). Further, though batting 100 of the present invention can be used in a myriad of different applications, one such application is as an acoustical underlayment. Batting 100 generally includes a first layer 102 and a second layer 104 distinct from first layer 102. First and second layers 102, 104 can be referred to herein as top and bottom layers 102, 104, respectively. First and second layers 102, 104 are each nonwoven and formed as first and second battings 102, 104, respectively, and thus can be referred to herein as such. Further, first and second layers 102, 104 are formed such that first layer 102 is denser than second layer 104, with the result that first layer 102 forms a firm acoustic layer, and second layer 104 forms a loft, which can be referred to as a lofty or lofted fill layer.

According to an exemplary embodiment of the present invention, first layer 102 includes a blend 106 of fibers (blend 106 can also be referred to herein as a mixture). Blend 106 includes fibers 108, fibers 110, and low-melt binder fibers 112. Each of fibers 108, 110, 112 are present in blend 106 in a predetermined percentage, respectively (all percentages of fibers referenced herein can be percentages with respect to the total weight or the total volume of the respective layer, such as layers 102 or 104). Optionally, fibers 108, 110, 112 are the only fibers of first layer 102. According to an exemplary embodiment of the present invention, fibers 108 are shoddy fibers 108. Shoddy fibers 108 can be, for example, a mixture of recycled clothing fibers that can be wool, cotton, polyester, rayon, or other types of fibers from shredded clothing, rags, towels, or the like. According to an exemplary embodiment of the present invention, blend 106 can include two groups of shoddy fibers 108, such that shoddy fibers 108 include a predetermined percentage of fire-retardant-treated shoddy fibers and a predetermined percentage of cotton shoddy fibers. Further, according to an exemplary embodiment of the present invention, fibers 110 are polyethylene terephthalate (PET) fibers (for example, 6×2 PET (black)), though any suitable material can be used for fibers 110.

Further, low-melt binder fibers 112 can have a melting temperature that is lower than any of the other fibers in the respective layer, such as first layer 102. By way of example and not limitation, the melting temperature of low-melt binder fibers 112 can be in the range of 110° C. to 180° C. Fibers 112 can be heated such that they melt at least partially. For example, according to an exemplary embodiment of the present invention, fibers 112 melt only partially, such that they become gelled and/or sticky, so as to bind with other fibers in the respective layer. Further, low-melt binder fibers 112 can be made of any suitable material and have any suitable arrangement. Fibers 112 need not be homogenous in a respective layer 102, 104, but can be made of different materials and have different arrangements. By way of example and not limitation, fibers 112 can be made of polyester (such as HTLM polyester), PET, and/or polyolefin (such as polyethylene, polypropylene). Further, a respective fiber 112 can be made of a single material or a plurality of material, such as two materials, which can be referred to as a bicomponent fiber. Such bicomponent fibers include a first material and a second material, wherein the first material has a lower melting temperature than the second material. A bicomponent fiber can have any suitable arrangement known in the art (by way of example and not limitation, a core and sheath arrangement).

According to an exemplary embodiment of the present invention, second layer 104 includes a blend 114 of fibers (blend 114 can also be referred to herein as a mixture and is different from blend 106). Blend 114 includes fibers 116, fibers 118, and low-melt binder fibers 120. Each of fibers 116, 118, 120 of second layer 104 can be the same or different material as that of fibers 108, 110, 112 of first layer 102. Each of fibers 116, 118, 120 are present in blend 114 in a predetermined percentage, respectively. Optionally, fibers 116, 118, 120 are the only fibers of second layer 104. According to an exemplary embodiment of the present invention, fibers 116 are shoddy fibers 116. Shoddy fibers 116 can be, for example, a mixture of recycled clothing fibers that can be wool, cotton, polyester, rayon, or other types of fibers from shredded clothing, rags, towels, or the like. According to an exemplary embodiment of the present invention, blend 114 can include two groups of shoddy fibers 116, such that shoddy fibers 116 include a predetermined percentage of fire-retardant-treated shoddy fibers and a predetermined percentage of cotton shoddy fibers. Further, according to an exemplary embodiment of the present invention, fibers 118 are PET fibers (for example, 6×2 PET (black)), though any suitable material can be used for fibers 118. The predetermined percentage of fibers 116 within blend 114 can be the same or different from the predetermined fibers 108 within blend 106. Thus, the respective predetermined percentages of the fire-retardant-treated shoddy fibers and of the cotton shoddy fibers in first layer 102 can be the same or different from the respective predetermined percentages of the fire-retardant-treated shoddy fibers and of the cotton shoddy fibers in second layer 104. Similarly, the predetermined percentage of fibers 110 of layer 102 can be the same or different from that of fibers 118 in second layer 104.

Further, low-melt binder fibers 120 can have a melting temperature that is lower than any of the other fibers in the respective layer, such as second layer 104. By way of example and not limitation, the melting temperature of low-melt binder fibers 120 can be in the range of 110° C. to 180° C. Fibers 120 can be heated such that they melt at least partially. For example, according to an exemplary embodiment of the present invention, fibers 120 melt only partially, such that they become gelled and/or sticky, so as to bind with other fibers in the respective layer. Further, fibers 120 can be made of any suitable material and have any suitable arrangement. Fibers 120 need not be homogenous in a respective layer 102, 104, but can be made of different materials and have different arrangements. By way of example and not limitation, fibers 120 can be made of polyester (such as HTLM polyester), PET, and/or polyolefin (such as polyethylene, polypropylene). Further, a respective fiber 120 can be made of a single material or a plurality of material, such as two materials, which can be referred to as a bicomponent fiber (as described above).

Further, binder fibers 112, 120 are the primary reason for the density difference between first and second layers 102, 104. More specifically, binder fibers 112 form a predetermined percentage of low-melt binder fibers 112 of the first layer 102, and binder fibers 120 form a predetermined percentage of low-melt binder fibers 120 of the second layer 104. The predetermined percentage of binder fibers 112 is greater than the predetermined percentage of binder fibers 120, such that first layer 102 is denser than second layer 104.

Binder fibers 112, 120 hold batting 100 together. Binder fibers 112 hold the fibers of first layer 102 together, and binder fibers 120 hold the fibers of second layer 104 together. That is, binder fibers 112 thermally bond (that is, heat bond) with respective ones of fibers 108 and respective ones of fibers 110. Such bonding is shown by way of bonds 122 (which appear as nodes 122 in FIG. 1). Further, binder fibers 120 thermally bond with respective ones of fibers 116 and respective ones of fibers 118. Such bonding is shown by way of bonds 124 (which appear as nodes 124 in FIG. 1).

Further, first and second layers 102, 104 (which are adjacent to one another) are thermally bonded together by way of binder fibers 112, 120. According to an exemplary embodiment of the present invention, first and second layers 102, 104 are held together only by way of binder fibers 112, 120 (for example, layers 102, 104 are not bonded together by another substance such as a resin, are not woven together, and are not needled together). Further, binder fibers 112 of first layer 102 bond with at least respective ones of fibers 116 and/or fibers 118 of second layer 104, and binder fibers 120 of second layer 104 bond with at least respective ones of fibers 108 and/or fibers 110 of first layer 102. The binder fibers 112, 120 which perform this bonding across layers 102, 104 are binder fibers 112 in a bottom portion of first layer 102 and binder fibers 120 in a top portion of second layer 104. Such binding of binder fibers 112, 120 with fibers 108, 110, 116, 118 of the opposing layer 102, 104 is shown by way of bonds 126 (which appear as nodes 126 in FIG. 1).

Optionally, first layer 102 may be densified at least in part by needling first layer 102. That is, as indicated, the primary way for densifying first layer 102 more than second layer 104 is by providing the greater predetermined percentage of binder fibers 112 in first layer 102 compared to the predetermined percentage of binder fibers 120 in second layer 104. However, during manufacture of batting 100, an additional processing step may be added, namely, needling first layer 102. Such needling can include tacking first layer 102, as is known. This needling occurs all the way through first layer 102. Such needling further densifies first layer 102. Second layer 104 is not needled.

Further, batting 100, when viewed from a front view (for example, viewing batting 100 from the right side of the page of FIG. 1), may have transverse sides such that vertical side walls of first layer 102 are in vertical alignment (coplanar) with vertical side walls of second layer 104. Alternatively, the vertical side walls of first layer 102 and the vertical side walls of second layer 104 may not be coplanar but may be transversely offset relative to one another, such that a transverse width of first layer 102 is greater than a transverse width of second layer 104, or, alternatively, the transverse width of first layer 102 is less than the transverse width of second layer 104.

Further, according to an exemplary embodiment of the present invention (and thus not by way of limitation), batting 100 can have certain traits. For example, batting 100 can have a total thickness (shown as height in FIG. 1) of approximately 25 millimeters (mm) and a total weight of 1,200 grams per square meter (gsm). First layer 102 can have a thickness of approximately 4 to 5 mm and a weight of approximately 300 to 500 gsm; this thickness can result in part from airlaying first layer 102 and needling (so as to tack) first layer 102 during manufacture. Second layer 104 can have a thickness of approximately 20 mm and a weight of approximately 900 gsm; this thickness can result in part from airlaying second layer 104 during manufacture.

In use, nonwoven batting 100 is an acoustic insulator and can thus be installed in a noise-abatement application. For instance, batting 100 can serve as a carpet underlayment in an automobile, wherein batting 100 is positioned underneath a carpet textile on the flooring of the passenger compartment. Depending upon the application, first layer 102 or second layer 104 can face the carpet, while the opposing layer 102 or 104 faces the sound waves—which are to be abated—coming toward the passenger compartment through the floor.

Figure 2:
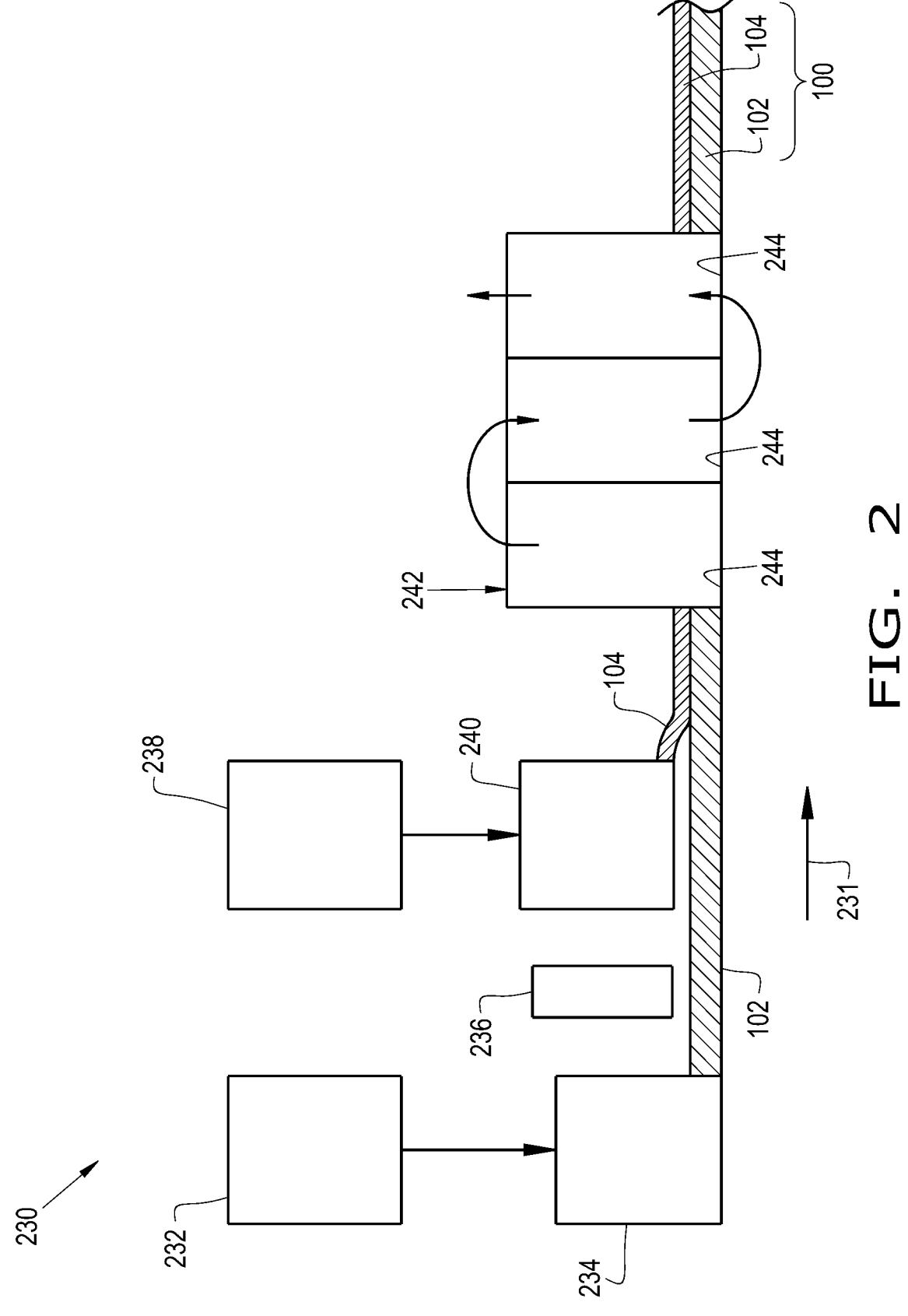
FIG. 2 is a schematic view of an exemplary embodiment of a manufacturing system for making the acoustic insulation web of FIG. 1, in accordance with an exemplary embodiment of the present invention.

Referring now to FIG. 2, there is shown (schematically) an exemplary embodiment of a manufacturing system 230 configured for performing a process 350 for making acoustic insulation web 100, in accordance with an exemplary embodiment of the present invention. System 230 includes a fiber feeder box 232, a web former 234, a loom 236, a fiber feeder box 238, a web former 240, and an oven 242. Though not shown, it can be appreciated that wires, forming wires, and/or belts can be used to transport batting 100 (it can be appreciated that batting 100 is forming all the way until process 350 is completed, but is referenced herein simply as web or batting 100) through system 230. Further, arrow 231 shows machine direction of system 230, that is, the general direction that batting 100 is moving from start to finish within system 230.

Fiber feeder box 232 is configured for supplying the fibers of first layer 102 (namely, fibers 108, 110, 112) to web former 234. Then, web former 234 is configured for forming first layer 102 and thus for cutting fibers 108, 110, 112 from fiber feeder box 232 to a predetermined size, mixing fibers 108, 110, 112 together with one another, mixing fibers 108, 110, 112 together with air, and/or depositing this air-fiber mixture on a moving belt or wire (which can be air permeable), this air-fiber mixture forming first layer 102, though fibers 108, 110, 112 are not yet bonded together. This belt (or, another belt) transports first layer 102 onward to loom 236, if a loom is used (if not, then first layer 102 is transported onward to web former 240). Loom 236 (which can be referred to as a needling loom 236) performs the needling step on first layer 102 (referenced above), needling first layer 102 all the way through first layer 102, thereby providing added density to first layer 102. Fiber feeder box 238 is configured for supplying the fibers of second layer 104 (namely, fibers 116, 118, 120) to web former 240. Then, web former 240 is configured for forming second layer 104 and thus for cutting fibers 116, 118, 120 from fiber feeder box 238 to a predetermined size, mixing fibers 116, 118, 120 together with one another, mixing fibers 116, 118, 120 together with air, and/or depositing this air-fiber mixture on first layer 102 (on what can be considered a bottom surface of first layer 102 in FIG. 1, which is opposite a surface of first layer 102 that is in contact with a bottom supporting moving belt), this air-fiber mixture forming second layer 104, though fibers 116, 118, 120 are not yet bonded together. One or more belts then transport first and second layers 102, 104 onward to oven 242.

Oven 242 is configured for heating batting 100 and thus for thermally bonding first and second layers 102, 104 together. As indicated above, heat from oven 242 is used to thermally bond fibers 108, 110, 112 together by partially melting binder fibers 112, which thereby attach to fibers 108, 110. Similarly, such heat is used to thermally bond fibers 116, 118, 120 together by partially melting binder fibers 120, which thereby attach to fibers 116, 118. Further, such heat is used to thermally bond binder fibers 112, 120 of layers 102, 104 to respective ones of fibers 108, 110, 116, 118 in adjacent portions of layers 102, 104, thereby bonding layers 102, 104 together, which results in a unified, single, dual density batting 100. Within oven 242, batting 100 can be held in place by top and bottom belts, that is, a bottom belt adjacent to an outer surface of first layer 102 and a top belt adjacent to an outer surface of second layer 104. Sandwiching batting 100 in this way between top and bottom belts holds layers 102, 104 together and provides a predetermined amount of pressure to batting 100 so as to enable controlling of the final thickness of batting 100 to a predetermined thickness (this final thickness is not controlled by needling). Oven 242 can be any suitable heating mechanism or oven. At least two chambers or zones of oven 242 can be used for heating the forming batting 100, and a final chamber or zone can be used to cool batting 100, bringing batting 100 to ambient temperature. In at least two zones, air is passed all the way through batting 100.

In general, oven 242 can include three chambers 244 or zones 244 where batting 100 is heated or cooled. FIG. 2 shows three such zones 244. In each zone, air is passed all the way through batting 100 vertically (that is, in a top to bottom flow direction, or a bottom to top flow direction, as indicated by the arrows in FIG. 2 associated with zones 244).

According to one exemplary embodiment of oven 242, at least the first two zones (in direction 231) can be heating zones, where batting 100 is heated to a relatively high temperature (for example, 300° C.) with circulating air that is heated, this air passing all the way through batting 100 vertically. The circulating air activates binder fibers 112, 120 to thermally bond with the other fibers 108, 110, 116, 118. The third zone 244 can be used to cool batting 100 back to ambient temperature, bringing binder fibers 112, 120 along with the entire batting 100 back to ambient temperature so that cooled binder fibers 112, 120 bind with other fibers 108, 110, 116, 118; this third zone 244 can also include passing air vertically all the way through batting 100. Alternatively, each of the three zones 244 in FIG. 2 can be used to heat batting 100, and a subsequent chamber or zone can be used to cool batting 100 to ambient temperature. Nevertheless, each zone 244 is shown to pass air in a single direction, and this direction changes successively from zone to zone. Alternatively, each zone 244 can be divided into sub-zones, such as three sub-zones, and air can change its vertical direction successively from sub-zone to sub-zone. Alternatively, regardless of whether each zone 244 has sub-zones, the air can simultaneously flow in both vertical directions in one or more zones 244 and/or sub-zone. Oven 242 can be a three-pass oven. Three-pass ovens are known.

In use, manufacturing system 230 is laid out within a manufacturing plant. Fiber feeder box 232 is in series with web former 234, and fiber feeder box 238 is in series with web former 240. However, fiber feeder box 232 and web former 234 are in parallel with (and thus separate and spaced apart from) fiber feeder box 238 and web former 240, though web former 240 lays second layer 104 on first layer 102. In this way, two different fiber blends—first and second blends 106, 114—can be formed (blends 106, 114 are thus not homogenous relative to one another). Belts and/or wires, on bottom and optionally on top of batting 100, can be used to carry batting 100 to oven 242. Within oven 242, batting 100 is carried by belts sandwiching batting 100 therebetween, in order to form batting 100 at a predetermined thickness (height). Batting 100 is carried through oven 242 so as to thermally bond (by heating) bond fibers 108, 110, 112 within layer 102, fibers 116, 118, 120 within layer 104, and layers 102, 104 together. The heat of oven 242 causes binder fibers 112, 120 to partially melt and to become gelled or sticky and thereby to join with other fibers as described, binder fibers 112, 120 melting (partially) before fibers 108, 110, 116, 118 because of their lower melting temperature. As binder fibers 112, 120 cool, they will hold individual layers 102, 104 together and will hold layers 102, 104 to one another, so as to form batting 100 with two distinctly different layers 102, 104 with distinctly different densities offering both a firm acoustic layer 102 and a less dense fill layer 104 formed in one process 350. A resin is not used to bind layers 102, 104 together. The present invention is different from a known method which forms two layers separately and then joins them together in a separate lamination process.

Figure 3:
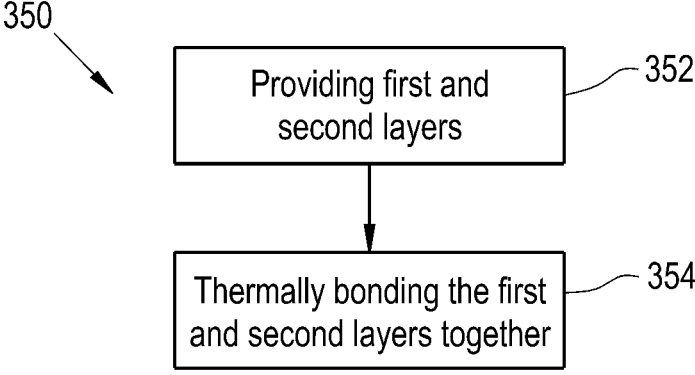
FIG. 3 is a flow diagram showing a process for making the acoustic insulation web of FIG. 1, in accordance with an exemplary embodiment of the present invention.

Referring now to FIG. 3, there is shown a flow diagram showing process 350 for making acoustic insulation web 100 of fibrous material 108, 110, 112, 116, 118, 120. Method 350 includes the steps of: providing 352 a first layer 102 and a second layer 104, the first layer 102 including a first plurality of low-melt binder fibers 112 forming a first predetermined percentage of the first layer 102, the second layer 104 including a second plurality of low-melt binder fibers 120 forming a second predetermined percentage of the second layer 104; and bonding thermally the first layer 102 and the second layer 104 together, the acoustic insulation web 100 being a nonwoven batting 100, the first predetermined percentage being greater than the second predetermined percentage such that the first layer 102 is denser than the second layer 104. The first layer 102 is a first batting 102 and the second layer 104 is a second batting 104. The first layer 102 includes a first blend 106 of fibers including: a first plurality of first fibers 108; a first plurality of second fibers 110; and the first plurality of low-melt binder fibers 112. The second layer 104 includes a second blend 114 of fibers including: a second plurality of first fibers 116; a second plurality of second fibers 118; and the second plurality of low-melt binder fibers 120. The first plurality of low-melt binder fibers 112 bonds with at least respective ones of the first plurality of first fibers 108 and the first plurality of second fibers 110, and with at least respective ones of at least one of the second plurality of first fibers 116 and the second plurality of second fibers 118. The second plurality of low-melt binder fibers 120 bonds with at least respective ones of the second plurality of first fibers 116 and the second plurality of second fibers 118, and with at least respective ones of at least one of the first plurality of first fibers 108 and the first plurality of second fibers 110. The first fibers 108, 116 can be shoddy fibers 108, 116, and the second fibers 110, 118 are polyethylene terephthalate fibers 110, 118. Process 350 can further include the step of needling the first layer 102 such that the first layer 102 is densified at least in part by needling.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A manufacturing system for making an acoustic insulation web of fibrous material, the manufacturing system comprising:

a first web former configured for forming a first layer including a first plurality of low-melt binder fibers forming a first predetermined percentage of the first layer;

a second web former configured for forming a second layer, the second layer including a second plurality of low-melt binder fibers forming a second predetermined percentage of the second layer;

a heating mechanism configured for thermally bonding the first layer and the second layer together, the acoustic insulation web being a nonwoven batting, the first predetermined percentage being greater than the second predetermined percentage such that the first layer is denser than the second layer, the manufacturing system having an absence of a third web former configured for forming a third layer including a plurality of fibers and thereby the manufacturing system is configured for making the acoustic insulation web that has an absence of the third layer; and a single loom configured for needling only the first layer and thereby for densifying the first layer at least in part by the needling, the loom preceding the heating mechanism in a machine direction of the manufacturing system and being positioned between the first web former and the second web former, the loom being further configured for needling all the way through the first layer, the manufacturing system being configured such that the forming of the second layer occurs in-line with both the forming and the needling of the first layer prior to the thermal bonding of the first layer and the second layer together and thereby the manufacturing system having an absence of an unwinding device from which a needled first layer is unwound.

2. The manufacturing system of claim 1, wherein the first layer is a first batting and the second layer is a second batting.

3. The manufacturing system of claim 2, wherein:
the first layer includes a first blend of fibers including:
    a first plurality of first fibers;
    a first plurality of second fibers; and
    the first plurality of low-melt binder fibers; and
the second layer includes a second blend of fibers including:
    a second plurality of first fibers;
    a second plurality of second fibers; and
    the second plurality of low-melt binder fibers.

4. The manufacturing system of claim 3, wherein:
the first plurality of low-melt binder fibers bonds with at least respective ones of the first plurality of first fibers and the first plurality of second fibers, and with at least respective ones of at least one of the second plurality of first fibers and the second plurality of second fibers; and
the second plurality of low-melt binder fibers bonds with at least respective ones of the second plurality of first fibers and the second plurality of second fibers, and with at least respective ones of at least one of the first plurality of first fibers and the first plurality of second fibers.

5. The manufacturing system of claim 4, wherein the first plurality of first fibers and the second plurality of first fibers are shoddy fibers, and the first plurality of second fibers and the second plurality of second fibers are polyethylene terephthalate fibers.

6. The manufacturing system of claim 1, wherein the first web former is a first air laying device and the second web former is a second air laying device.

7. The manufacturing system of claim 1, wherein the manufacturing system has an absence of a carding device, a device for bonding the first layer and the second layer together using a resin, and a device for weaving the first layer and the second layer together.

8. A process for making an acoustic insulation web of fibrous material, the process comprising the steps of:
    providing a manufacturing system for making the acoustic insulation web, the manufacturing system including a first web former, a second web former, a single loom, and a heating mechanism;
    forming a first layer by way of the first web former and a second layer by way of the second web former, the first layer including a first plurality of low-melt binder fibers forming a first predetermined percentage of the first layer, the second layer including a second plurality of low-melt binder fibers forming a second predetermined percentage of the second layer;
    needling, by way of the loom, only the first layer such that the first layer is densified at least in part by the needling; and
    bonding thermally, by way of the heating mechanism, the first layer and the second layer together, the acoustic insulation web being a nonwoven batting, the first predetermined percentage being greater than the second predetermined percentage such that the first layer is denser than the second layer, the acoustic insulation web including the first layer and the second layer but having an absence of a third layer including a plurality of fibers, the loom preceding the heating mechanism in a machine direction of the manufacturing system and being positioned between the first web former and the second web former, the loom needling all the way through the first layer, the manufacturing system being configured such that the forming of the second layer occurs in-line with both the forming and the needling of the first layer prior to the thermal bonding of the first layer and the second layer together and thereby the manufacturing system having an absence of an unwinding device from which a needled first layer is unwound.

9. The process of claim 8, wherein the first layer is a first batting and the second layer is a second batting.

10. The process of claim 9, wherein:
the first layer includes a first blend of fibers including:
    a first plurality of first fibers;
    a first plurality of second fibers; and
    the first plurality of low-melt binder fibers; and
the second layer includes a second blend of fibers including:
    a second plurality of first fibers;
    a second plurality of second fibers; and
    the second plurality of low-melt binder fibers.

11. The process of claim 10, wherein:
the first plurality of low-melt binder fibers bonds with at least respective ones of the first plurality of first fibers and the first plurality of second fibers, and with at least respective ones of at least one of the second plurality of first fibers and the second plurality of second fibers; and
the second plurality of low-melt binder fibers bonds with at least respective ones of the second plurality of first fibers and the second plurality of second fibers, and with at least respective ones of at least one of the first plurality of first fibers and the first plurality of second fibers.

12. The process of claim 11, wherein the first plurality of first fibers and the second plurality of first fibers are shoddy fibers, and the first plurality of second fibers and the second plurality of second fibers are polyethylene terephthalate fibers.

\*    \*    \*    \*    \*